US008875929B1

(12) United States Patent
Forney et al.

(10) Patent No.: US 8,875,929 B1
(45) Date of Patent: Nov. 4, 2014

(54) CONTAINER FOR COLLAPSIBLE FOOD POUCH

(71) Applicants: DonnaMarie Forney, Annandale, VA (US); Matthew Forney, Annandale, VA (US)

(72) Inventors: DonnaMarie Forney, Annandale, VA (US); Matthew Forney, Annandale, VA (US)

( * ) Notice: Subject to any disclaimer, the term of this patent is extended or adjusted under 35 U.S.C. 154(b) by 0 days.

(21) Appl. No.: 13/905,079

(22) Filed: May 29, 2013

(51) Int. Cl.
*B65D 77/06* (2006.01)
*B65D 85/72* (2006.01)
*A47J 43/00* (2006.01)

(52) U.S. Cl.
CPC *B65D 85/72* (2013.01); *A47J 43/00* (2013.01)
USPC ............ 220/495.06; 222/105; 220/495.03; 220/495.05

(58) Field of Classification Search
USPC ........... 206/349; 220/495.01, 495.03, 495.06, 220/690, 495.05; 222/105, 103
See application file for complete search history.

(56) References Cited

U.S. PATENT DOCUMENTS

| 4,533,057 | A | * | 8/1985 | Klittich | 215/11.3 |
| 5,730,327 | A | * | 3/1998 | Stern | 222/82 |
| 5,738,122 | A | | 4/1998 | Armbruster et al. | |
| 6,142,344 | A | * | 11/2000 | Kai | 222/183 |
| 6,880,729 | B2 | | 4/2005 | Stull et al. | |
| 2001/0038010 | A1 | * | 11/2001 | Chien | 220/4.01 |
| 2003/0234206 | A1 | | 12/2003 | Hetzler et al. | |
| 2004/0118477 | A1 | | 6/2004 | Desmond | |

* cited by examiner

*Primary Examiner* — Mickey Yu
*Assistant Examiner* — Allan Stevens
(74) *Attorney, Agent, or Firm* — Louis Ventre, Jr.

(57) ABSTRACT

A container for holding a collapsible food pouch that includes a hard-plastic bottom segment forming an elongated concave dish and a rotatably attached top segment. The top end of the bottom segment and optionally the top end of the top segment has a slot sized to receive a plastic discharge tube of the collapsible food pouch such that when the pouch's pliant material is placed below the top end, the discharge port of the pouch is positioned outside the top end of hard-plastic bottom segment. When the top segment is rotated closed, the top segment engages the plastic neck to hold it within the slot. The top segment may have two doors. A loop of hard plastic may serve as a tethering point and a lock may lock the container closed. Vent holes permit entry of air into the container.

4 Claims, 5 Drawing Sheets

CONTAINER FOR COLLAPSIBLE FOOD POUCH

TECHNICAL FIELD

In the field of special receptacles, a container is configured to hold a collapsible food pouch, the collapsible food pouch being formed of flaccid material so that the food pouch can be compressed to expel its contents, the container preventing accidental or unwanted discharge of the food pouch contents.

BACKGROUND ART

Numerous food products are packaged in squeezable pouches, such as for example, fruit drinks, yogurt, pudding and baby foods. These are essentially convenience packages for directly delivering squeezable food and drinks to the consumer without requiring knives, spoons or other eating utensils.

These squeezable pouches typically have a plastic tube at the end of the pouch so that a consumer can squeeze the pouch and force out to expel or extrude the food product from the pouch. Also, less viscous food products can typically also be sucked out of the pouch by a consumer without squeezing the pouch.

Squeezable pouches come in a variety of widths and even greater variety of lengths to accommodate different volumes of food or drink content. One common consistency is the use of flanges on the plastic tube used for the purpose of pouch filling operations. While the present invention does not require a flange on the plastic tube, such a flange helps to prevent sliding of the plastic tube in the container and holds the food pouch in a consistent position for feeding regardless of the dimensions of any particular manufacturer's food pouch.

SUMMARY OF INVENTION

A container for holding a collapsible food pouch is disclosed. The pouch is formed of pliant material that can be compressed to expel the food from the food pouch through a plastic tube and out a discharge port once the discharge port is uncapped. The container is a case that includes a hard-plastic bottom segment forming an elongated concave dish. The top end of the dish has a slot sized to receive the plastic tube of the collapsible food pouch such that when the pliant or flaccid material is placed below the top end, the discharge port is positioned outside the top end of hard-plastic bottom segment. The container has a hard-plastic top segment that is rotatably attached to the bottom segment so as to be rotated to enclose within the container the pliant material of the food pouch previously placed below the top end of the bottom segment. When said hard-plastic top segment is rotated closed, the top segment engages the plastic neck to hold it within the slot. The top segment may be made of two doors hingeably attached to both sides of the bottom segment so that they can be rotated closed. The bottom segment may include a loop of hard plastic attached at the bottom end to serve as a tethering point. The container may have a hard-plastic tab attached so as to wrap around the closed container and lock the door or doors closed. The container may include one or more vent holes permitting entry of air into the container when a food pouch is enclosed in the container. There may be a second slot in the top segment that complements the slot in the bottom segment to also engage the plastic tube on the food pouch.

Technical Problem

Squeezable food pouches are very convenient for babies and toddlers to feed from. However, parents must often pay close attention to avoid having children squeezing the contents of a food pouch and making a mess. Parents need a device to make the children more independent in allowing their children to feed from a food pouch. There is presently no means to prevent unintended and unwanted squeezing of the food pouch yet enabling the contents are being sucked out by through the plastic tube (also referred to as a neck or a spout of the food pouch) as if one were sucking through a straw.

Solution to Problem

A hard plastic container holds a squeezable food pouch. The spout of the food pouch preferably slides into a slot at the top of the hard plastic container to prevent the food pouch from sliding into the enclosure. A hard plastic door or doors rotate closed to encircle the flexible part of food pouch and fixing the neck in place, sticking out of the top of the hard plastic container. The doors may be spring loaded or may include latch closure to secure the hard plastic container in a closed position. The hard plastic container holds the food pouch so that its cap may be removed when the food in the food pouch is ready to be eaten and handed to the individual who will be sucking out the contents.

Advantageous Effects of Invention

This hard plastic container or enclosure may be used by infants and toddlers who have developed the fine motor skills and coordination to hold their own food delivery device (e.g. bottle or sippy cup), but do not yet understand the cause and effect that squeezing a food pouch too aggressively causes the contents to eject in an uncontrolled manner.

This hard plastic container or enclosure may be used to hold food pouches and keep a person (child, toddler, someone with disabilities or elderly) from making a mess while consuming the food in the food pouch. It is useful to adults, who want to take advantage of the premeasured food quantities in a food pouch, but for a variety of medical reasons may have lost the sense of pressure such that they may occasionally squeeze the food pouch too aggressively.

BRIEF DESCRIPTION OF DRAWINGS

The drawings illustrate preferred embodiments of the method of the invention and the reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
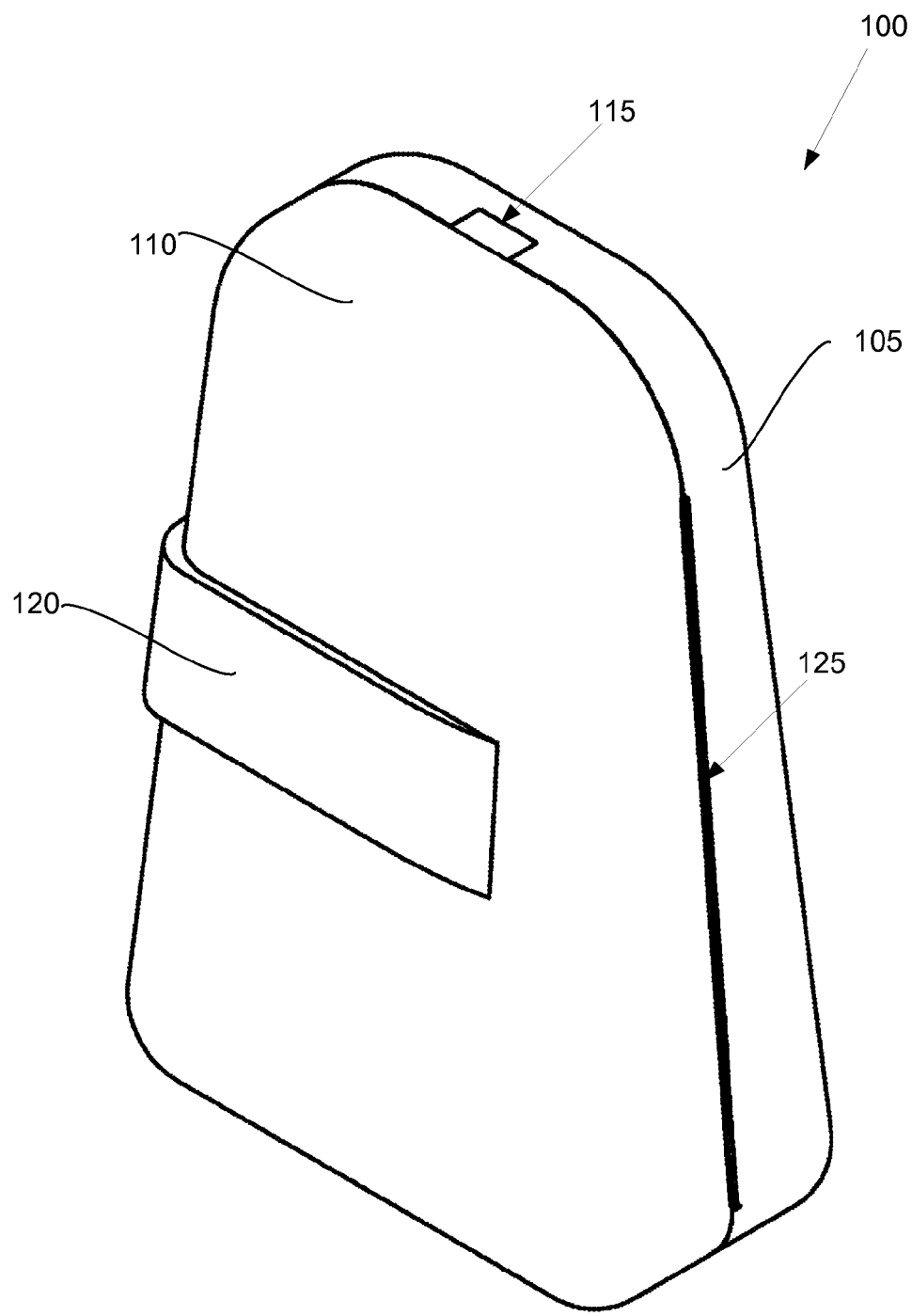
FIG. 1 is a perspective of an embodiment of the container showing hard-plastic top segment comprising a single door.

FIG. 1 shows a perspective of an embodiment of the container (100) for holding a collapsible food pouch (200). FIG. 1 shows a hard-plastic top segment (110) comprising a single door that is hinged to the hard-plastic bottom segment (105) at the right side with a plastic hinge (125) that is thinner but made of the same hard plastic material as the container (100). While this thin plastic hinge is preferable for simplicity, cost and ease of manufacture, the hinge might instead be a traditional metal hinge and it may be spring loaded to hold the hard-plastic top segment (110) closed.

Figure 2:
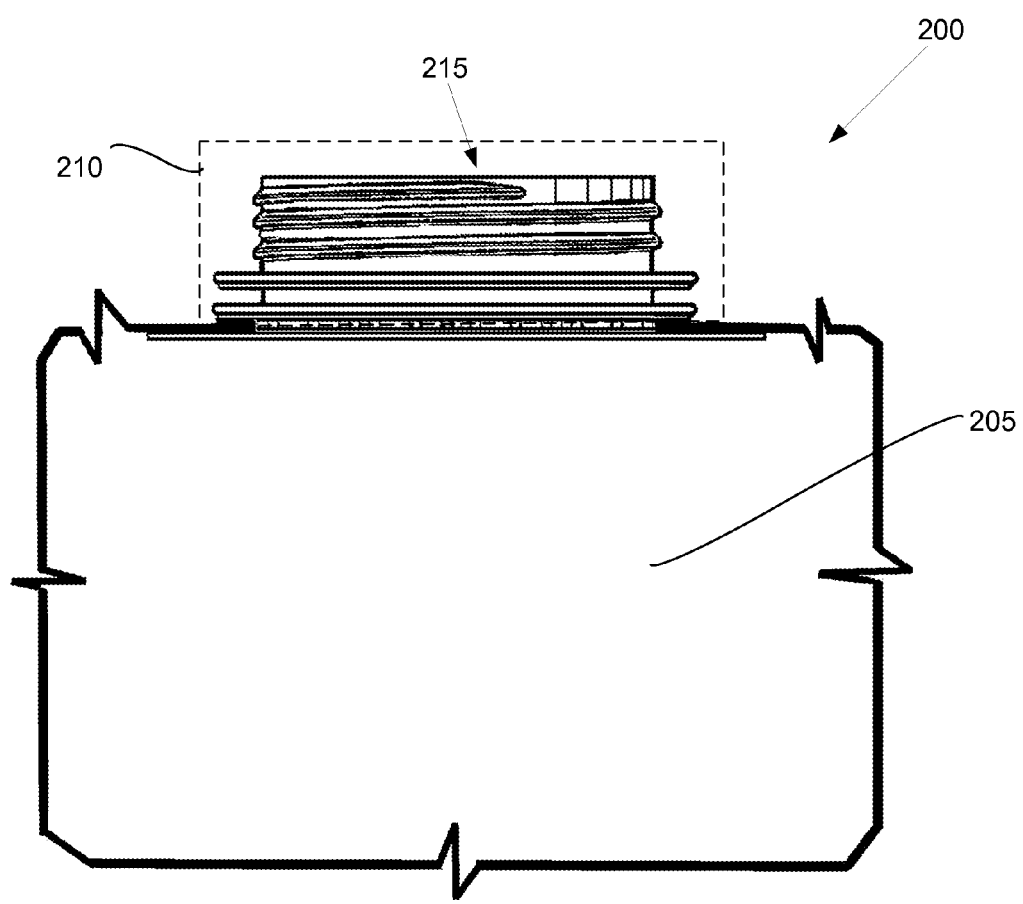
FIG. 2 is an elevation view of a representative collapsible food pouch.

FIG. 2 shows a representative collapsible food pouch (200) that would be partially enclosed by the container (100). The interrupted lines around the periphery of the collapsible food pouch (200) indicate that the exact size and shape may vary. Premeasured food pouches typically come in a variety of widths and even greater variety of lengths to accommodate different volumes of food content.

The collapsible food pouch (200) is formed of flaccid material (205), which is also referred to as a squeezable, flexible or pliant material. The flaccid material (205) can be compressed to expel food from the collapsible food pouch through a plastic neck (210) and out a discharge port (215) once the discharge port (215) is uncapped. The dashed enclosure shown in FIG. 2 is there to clarify what is meant by the plastic neck (210) therein. Referring to FIG. 2, it can be seen that the representative collapsible food pouch (200) has a flange on the plastic neck (210) that is used by the manufacturer to aid in filling the collapsible food pouch (200) with the food product. This flange, when present, further enhances operability of the container (100) because it can lock in the collapsible food pouch (200) to a fixed position in the container (100).

The container (100) includes a hard-plastic bottom segment (105) and a hard-plastic top segment (110), each having a defined configuration.

The hard-plastic bottom segment (105) is formed in the shape of an elongated concave dish. This concave shape provides room within a closed container (100) to host the collapsible food pouch (200). The hard-plastic bottom segment (105), i.e. the concave dish, includes a top end (650) that defines a first slot (115) of sufficient dimensions to receive the plastic neck (210) of the collapsible food pouch (200) such that when flaccid material (205) is placed below the top end (650), the discharge port (215) is positioned outside the top end (650) of hard-plastic bottom segment (105). Preferably, when a flange on the collapsible food pouch (200) is present, the first slot (115) is configured so that the flange straddles the first slot (115) so that the plastic neck (210) cannot slide relative to the container (100).

Figure 3:
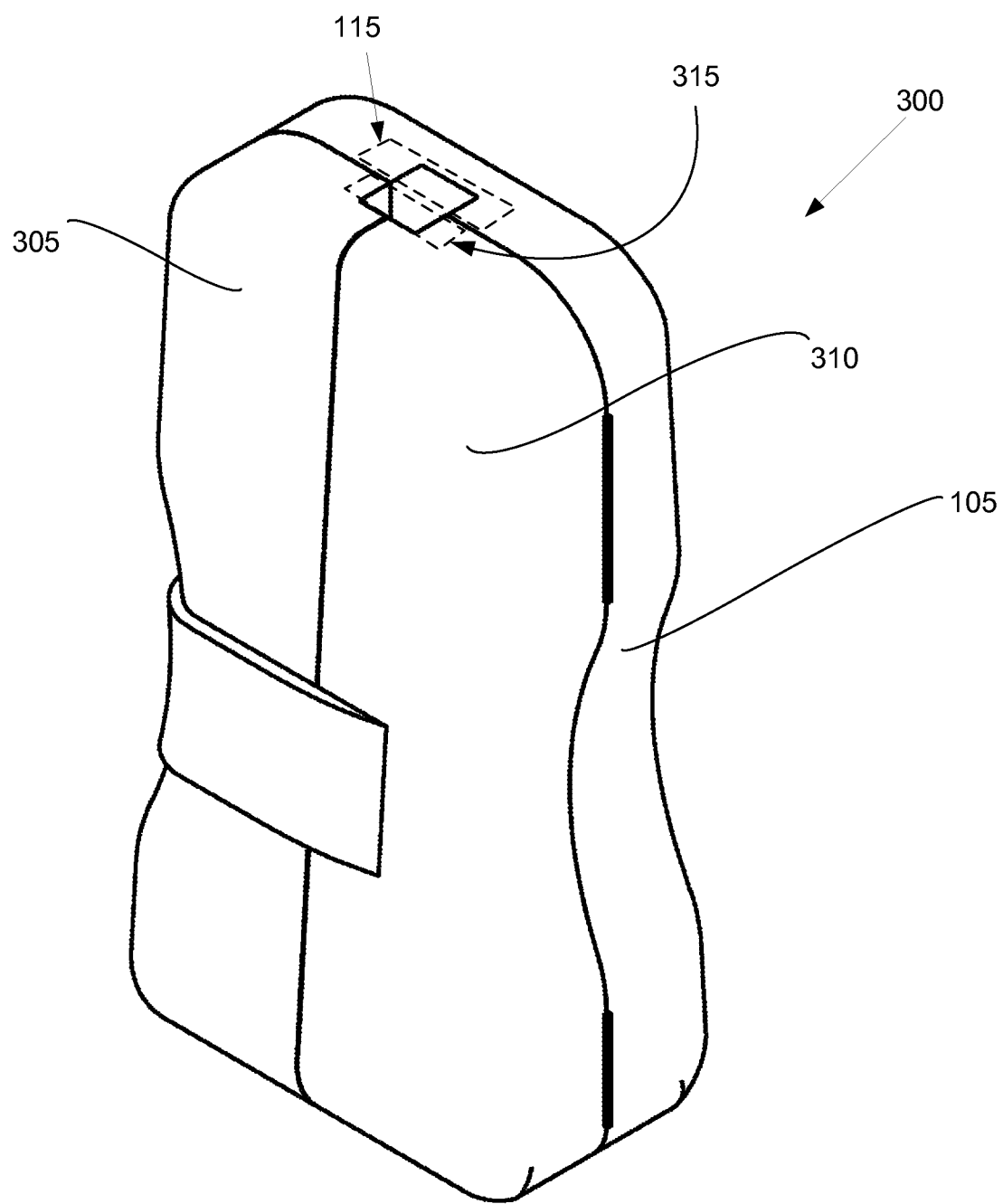
FIG. 3 is a perspective of an alternative embodiment of the container showing hard-plastic top segment comprising two doors.
Figure 4:
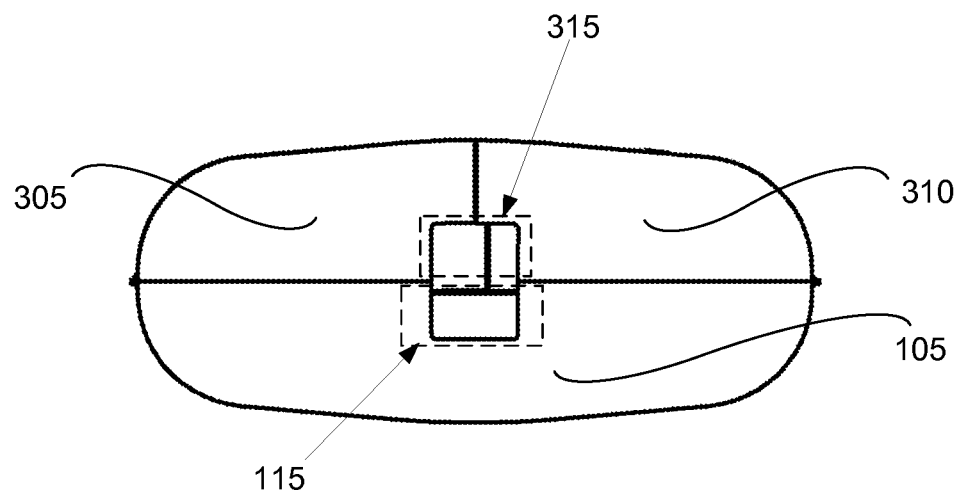
FIG. 4 is a top end elevation view showing a slot in the hard-plastic top segment and the hard-plastic bottom segment.

The hard-plastic top segment (110) is rotatably attached to the hard-plastic bottom segment (105). This may be a thin plastic connection between the two or a physical hinge, as discussed above. In either case, the hard-plastic top segment (110) may be rotated to enclose within the container (100) the flaccid material (205) of the collapsible food pouch (200) previously placed below the top end (650) of the hard-plastic bottom segment (105). When the hard-plastic top segment (110) is rotated closed with the collapsible food pouch (200) within, then the hard-plastic top segment (110) engages the plastic neck (210) to hold it within the first slot (115). Alternatively, the hard plastic top segment (110) may have a second slot (315), as shown in FIG. 3. The second slot mates with the first slot (115) and together, the first slot (115) and the second slot (315) hold the plastic neck (210) in a fixed position. For a food pouch without a flange, the slots may have a friction material, such as a gasket material, that resists movement of the plastic neck (210). Thus, optionally, the hard-plastic top segment (110) defines a second slot (315) such that when the hard-plastic top segment (110) is rotated to enclose within the container (100) the flaccid material (205), the second slot (315) is aligned with the first slot (115) and the second slot (315) engages the plastic neck (210).

FIG. 3 illustrates a second container embodiment (300) that includes a hard-plastic top segment (110) comprising two doors folding inward, instead of one door as shown in FIG. 1. These doors are a left-side door (305) and a right-side door (310). The dashed enclosure showing the first slot (115) is there only to enhance clarity in identifying where the first slot is located in comparison to a second slot (315) within a second dashed enclosure. The second slot (315) is formed by the closure of the left-side door (305) and the right-side door (310).

As shown in FIG. 3, the hard-plastic bottom segment (105) has a left-side end (620) and a right-side end (630). The left-side door (305) is rotatably attached to the left-side end (620) and the right-side door (310) is rotatably attached to the right-side end (630). Here again, the hingeable arrangement is as described above, preferably encompassing a thinning of the same plastic material forming the container. The hinged attachment is such that when left-side door (305) is rotated toward the right-side end (630) and the right-side door (310) is rotated toward the left-side end (620), the left-side door (305) and the right-side door (310) meet above and between the left-side end (620) and a right-side end (630) to enclose the flaccid material (205) of the collapsible food pouch (200) within the second container embodiment (300).

Because the collapsible food pouch (200) is flexible in nature, the bifold doors in this embodiment allow for a smaller container, because the collapsible food pouch (200) can then slightly extend over the sides of the hard-plastic bottom segment (105) but yet be folded within the container when the bifold doors are closed. This is easily seen in FIG. 6 where it can be imagined that the width of a collapsible food pouch (200) extends over the left-side end (620) and over the right-side end (630) of the bottom hard-plastic bottom segment (105), yet the left-side door (305) and the right-side door (310) can easily fold closed to enclose the collapsible food pouch (200). When an embodiment of the container (100) has a single hinged door, the hard-plastic bottom segment (105) may further include an interior wall which extends beyond the door's hinge so that it first folds the edge of the collapsible food pouch (200) inwards as the door is closed preventing the edge from sticking out.

Figure 6:
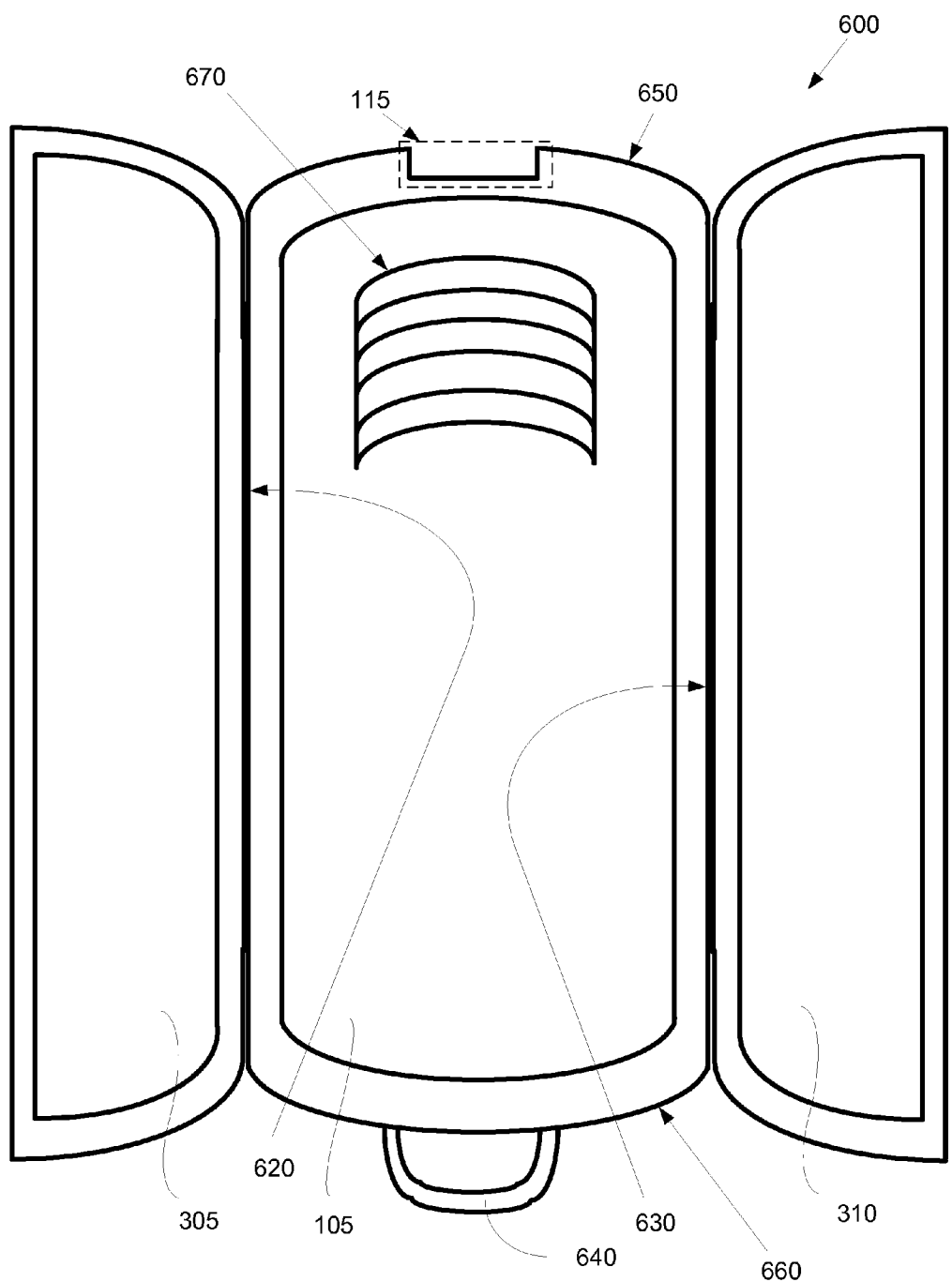
FIG. 6 is a plan view of an alternative embodiment of the container showing hard-plastic top segment comprising two doors, vent holes, a slot at the top end of the hard-plastic bottom segment, and a loop of hard plastic on the bottom end of the hard-plastic bottom segment.

As shown in FIG. 6, the hard-plastic bottom segment (105) may further include a loop of hard plastic (640) attached at the bottom end (660). The loop of hard plastic (640) may extend from any part of the container in any embodiment thereof.

Figure 5:
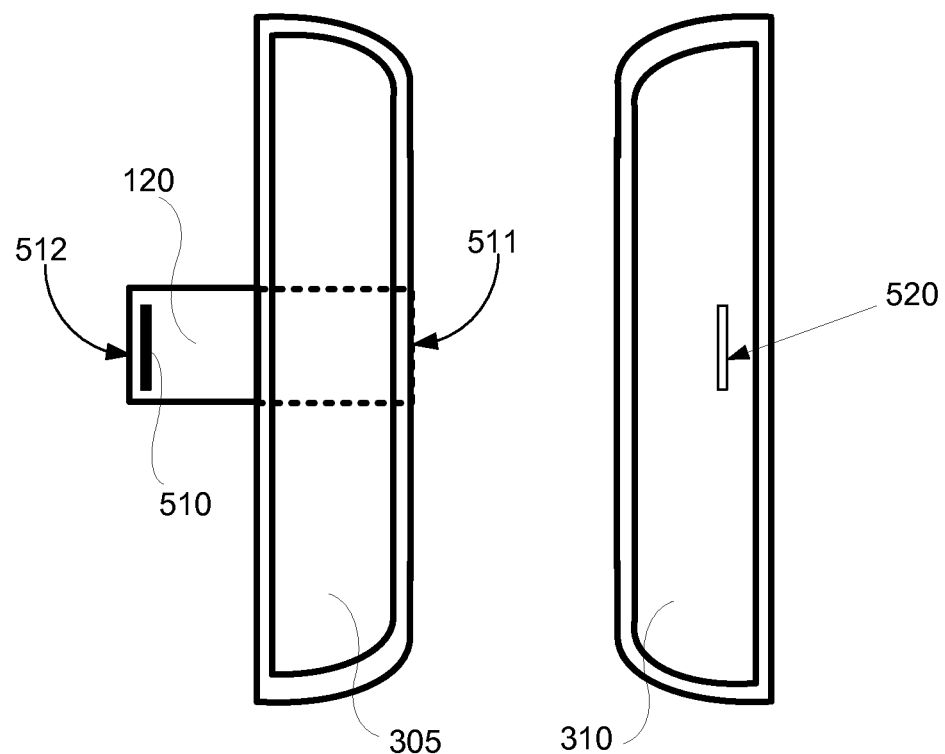
FIG. 5 is a plan view of two doors in a hard-plastic top segment showing the hard-plastic tab with a hard-plastic protrusion on the left-side door and a hole for receiving the protrusion on the right-side door.

The door or doors of the container (100) may be fitted with a lock to hold the doors closed. FIG. 1 shows the container (100) include a hard-plastic tab (120), which serves as a lock. FIG. 5 shows that the hard-plastic tab (120) has an attachment end (511) and a distal end (512). The attachment end (511) is rotatably connected to the container (100) such that the distal end (512) may be rotated to wrap around the container (100). Here again a thinned plastic joint fixing the hard-plastic tab (120) to the container is preferred, but a standard metal hinge may be used. In the embodiment shown in FIG. 5, the hard-plastic tab (120) has a hard-plastic protrusion (510) extending therefrom near the distal end (512). A hole (520) for receiving the hard-plastic protrusion (510) is in this embodiment located on the right-side door (310). The hard-plastic tab (120) may be any length and consequently, the hole (520) may be located at any part of the container (100). In this sense, the container (100) defines a hole for mating with the hard-plastic protrusion (510) to lock the hard-plastic top segment (110) in a closed position.

FIG. 6 shows a third container embodiment (600) that has vent holes (670) to allow air to freely enter a closed container. In this embodiment, the vent holes (670) also serve as strap guides to tether the container. A strap commonly found with most baby seats can easily weave through these vent holes (670) to hold the third container embodiment (600) so that it does not get lost. Thus, optionally, the hard-plastic bottom segment (105) defines one or more vent holes (670) permitting entry of air into the container (100) when a collapsible food pouch (200) is enclosed therein.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the food packaging industry.

What is claimed is:

1. A container system comprising:
   a collapsible food pouch, the collapsible food pouch comprising flaccid material that can be compressed to expel food from the collapsible food pouch; a plastic neck comprising threads, the plastic neck formed as part of the collapsible food pouch through which the food is expelled; and a discharge port formed as a part of the plastic neck;
   a hard-plastic bottom segment forming an elongated concave dish, said concave dish comprising a top end, said top end defining a first slot sufficient to receive the plastic neck of the collapsible food pouch such that when flaccid material is placed below the top end, the discharge port is positioned outside the top end of hard-plastic bottom segment;
   a hard-plastic top segment, said hard-plastic top segment rotatably attached to the hard-plastic bottom segment such that the hard-plastic top segment may be rotated to enclose within the container the flaccid material previously placed below the top end of the hard-plastic bottom segment and when said hard-plastic top segment is so rotated, the hard-plastic top segment engages the plastic neck to hold it within the first slot;
   wherein the hard-plastic bottom segment further comprises a left-side end; and a right-side end; and wherein the hard-plastic top segment comprises a left-side door rotatable attached to the left-side end and a right-side door rotatably attached to the right-side end such that when left-side door is rotated toward the right-side end and the right-side door is rotated toward the left-side end, the left-side door and the right-side door meet above and between the left-side end and the right-side end to enclose the flaccid material within the container; and
   a hard-plastic tab, the hard-plastic tab comprising an attachment end and a distal end, wherein the attachment end is attached to one of the left-side door and right-side door and the distal end cooperates with a hole in the hard-plastic bottom segment.

2. The container system of claim 1, wherein the hard-plastic bottom segment further comprises a bottom end, said container further comprising a loop of hard plastic attached at the bottom end.

3. The container system of claim 1, wherein the hard-plastic bottom segment defines one or more vent holes permitting entry of air into the container when the collapsible food pouch is enclosed therein.

4. The container system of claim 1, wherein the hard-plastic top segment defines a second slot such that when the hard-plastic top segment is rotated to enclose within the container the flaccid material, the second slot is aligned with the first slot and the second slot engages the plastic neck.

* * * * *